(12) United States Patent
Müller et al.

(10) Patent No.: US 11,519,746 B2
(45) Date of Patent: Dec. 6, 2022

(54) METHOD FOR PROVIDING A DISPLAY IN A MOTOR VEHICLE, AND MOTOR VEHICLE

(71) Applicant: SMR Patents S.à.r.l., Luxembourg (LU)

(72) Inventors: Nils Arne Müller, Gelnhausen (DE); Andreas Herrmann, Stuttgart (DE)

(73) Assignee: SMR Patents S.à.r.l., Luxembourg (LU)

(*) Notice: Subject to any disclaimer, the term of this patent is extended or adjusted under 35 U.S.C. 154(b) by 370 days.

(21) Appl. No.: 16/633,469

(22) PCT Filed: Jul. 23, 2018

(86) PCT No.: PCT/EP2018/069913
§ 371 (c)(1),
(2) Date: Jan. 23, 2020

(87) PCT Pub. No.: WO2019/020564
PCT Pub. Date: Jan. 31, 2019

(65) Prior Publication Data
US 2020/0232807 A1  Jul. 23, 2020

(30) Foreign Application Priority Data
Jul. 24, 2017  (DE) .......................... 102017116702.1

(51) Int. Cl.
*G01C 21/36*  (2006.01)
*G01S 19/42*  (2010.01)
(Continued)

(52) U.S. Cl.
CPC ............ *G01C 21/367* (2013.01); *B60K 35/00* (2013.01); *G01C 21/3602* (2013.01);
(Continued)

(58) Field of Classification Search
CPC .............. G01C 21/367; G01C 21/3602; G01C 21/3697; B60K 35/00; B60K 2370/1529;
(Continued)

(56) References Cited

U.S. PATENT DOCUMENTS

| 2004/0178894 A1* | 9/2004 | Janssen ................ G01C 21/365 348/148 |
| 2010/0198506 A1* | 8/2010 | Neilhouse ............ G01C 21/365 701/532 |

(Continued)

FOREIGN PATENT DOCUMENTS

| DE | 102014208740 A1 | 11/2015 |
| DE | 102015015676 A1 | 7/2016 |

(Continued)

OTHER PUBLICATIONS

International Search Report dated Sep. 10, 2018 of International application No. PCT/EP2018/069913.
(Continued)

*Primary Examiner* — Brent D Castiaux
(74) *Attorney, Agent, or Firm* — Jones Day

(57) ABSTRACT

A method includes determining the position of the motor vehicle, identifying at least one object not relevant to road traffic as an object in the landscape in the surroundings of the motor vehicle, depending on the determined position, detecting at least the direction of view of a passenger as an occupant of the motor vehicle, and providing a display with information about the at least one object in the landscape viewed by the passenger, such that said information is provided in the direct field of view of the passenger, as defined by the direction of view of the same, in the same place as the object.

14 Claims, 4 Drawing Sheets

(51) Int. Cl.
*G02B 27/00* (2006.01)
*G02B 27/01* (2006.01)
*G06F 3/01* (2006.01)
*G06V 20/58* (2022.01)
*B60K 35/00* (2006.01)

(52) U.S. Cl.
CPC .......... *G01S 19/42* (2013.01); *G02B 27/0093* (2013.01); *G02B 27/0101* (2013.01); *G06F 3/013* (2013.01); *G06V 20/582* (2022.01); *G06V 20/584* (2022.01); *B60K 2370/1529* (2019.05); *B60K 2370/166* (2019.05); *B60K 2370/186* (2019.05); *B60K 2370/21* (2019.05); *B60K 2370/794* (2019.05); *G02B 2027/014* (2013.01); *G02B 2027/0141* (2013.01)

(58) Field of Classification Search
CPC ........ B60K 2370/166; B60K 2370/186; B60K 2370/21; B60K 2370/794; G01S 19/42; G02B 27/0093; G02B 27/0101; G02B 27/01; G02B 2027/014; G02B 2027/0141; G02B 2027/0187; G02B 2027/0138; G06F 3/013; G06V 20/582; G06V 20/584; B60R 2300/301; B60R 2300/70; B60R 1/00
See application file for complete search history.

(56) References Cited

U.S. PATENT DOCUMENTS

| 2014/0211319 | A1* | 7/2014 | Park | G02B 27/01 359/630 |
| 2015/0062168 | A1* | 3/2015 | Ng-Thow-Hing | G02B 27/0101 345/633 |
| 2015/0094897 | A1* | 4/2015 | Cuddihy | H04N 21/4122 701/23 |
| 2016/0009175 | A1* | 1/2016 | McNew | H04N 13/383 340/438 |

FOREIGN PATENT DOCUMENTS

| EP | 2511750 A1 | 10/2012 |
| WO | WO 2003/005102 A1 | 1/2003 |

OTHER PUBLICATIONS

Written Opinion dated Sep. 10, 2018 of International application No. PCT/EP2018/069913.

\* cited by examiner

METHOD FOR PROVIDING A DISPLAY IN A MOTOR VEHICLE, AND MOTOR VEHICLE

CROSS-REFERENCE TO RELATED ART

This application is a National Stage Entry of International Patent Application No. PCT/EP2018/069913, filed Jul. 23, 2018, which claims the benefit of foreign priority to German Patent Application No. 10 2017 116 702, filed Jul. 24, 2017, each of which is hereby incorporated by reference in its entirety for all purposes.

BACKGROUND

1. Field of the Invention

The present disclosure relates to a method for providing a display in a motor vehicle and to a motor vehicle in which the method is implemented.

2. Related Art

DE 10 2012 216 057 A1 describes a head-mounted display which provides information, for example regarding local speed limits, in a display field. The direction of view of the vehicle operator is detected and, optionally, the display field for the information is shifted if it would interfere with a clear view.

DE 10 2015 015 676 A1 discloses the display of an image of a traffic light on a separate display device of a motor vehicle if the driver would not otherwise see this traffic light due to the direction of view of said driver.

For handling production and machine tools, it is known from DE 101 08 064 A1 to visually provide information about an object which the user is currently viewing based on an eye position detected with an eye tracking system.

SUMMARY

In an aspect, a method includes:
a) determining the position of the motor vehicle;
b) identifying at least one object, in particular in the surroundings of the motor vehicle, depending on the determined position;
c) detecting the direction of view of at least one occupant of the motor vehicle; and
d) providing a display with information about the at least one object, such that said information is provided in the direct field of view of the occupant, as defined by the direction of view of the same.

In particular, the method may include the following steps: determining the position of the motor vehicle; identifying at least one object not relevant to road traffic as an object in the landscape in the surroundings of the motor vehicle, depending on the determined position; detecting at least the direction of view of a passenger as an occupant of the motor vehicle; and providing a display with information about the at least one object in the landscape viewed by the passenger, such that said information is provided in the direct field of view of the passenger, as defined by the direction of view of the same, in the same place as the object.

The occupant is thus intuitively presented with a piece of information which is interesting to them, as they need not change their direction of view in order to receive the information. The passenger as the occupant refers in this case to the non-driver in a motor vehicle. By contrast, the driver refers only to the person actively driving the motor vehicle. In the case of autonomous driving, the term "non-driver" also refers to the person who, though sitting in the driver's seat, must not actively interfere in the driving due to an autonomously driving motor vehicle and is thus a non-driver. Thus, all occupants in an autonomously driving motor vehicle are non-drivers and thereby passengers according to this application.

Preferably, in step b), at least one object relevant to road traffic, such as a traffic sign, a traffic light or the like, is identified, in step c), at least the direction of view of the motor vehicle operator is identified, and the providing of the display in step d) occurs depending on whether the motor vehicle operator is capable of seeing the object themselves. In step c), it can also be detected whether the motor vehicle operator is capable of seeing the object themselves directly.

Consequently, the driver looking away from the object can be displayed the same in another place; though it can also mean that the object is obscured as determined by the motor vehicle using, for instance, a camera or a radar device and that the missing information is nevertheless made available to the driver.

It is further preferred according to the invention that, in step b), at least one object not relevant to road traffic, such as an object in the landscape, a landmark or the like, is identified, in step c), at least the direction of view of an occupant is identified, and the providing of the display in step d) includes information about the object, in particular in the form of a text display. In this respect, the method is particularly suitable for a passenger or another occupant who is different from the motor vehicle operator. Indeed, it makes useful and helpful information available to a viewer of the surroundings. Consequently, a passenger can be selected as the occupant, or, if autonomous driving of the vehicle is detected, the motor vehicle operator and/or the passenger can also be selected as the occupant(s).

It is additionally provided according to the invention that the information presented with the display can be changed or adapted to the occupant, preferably in a self-learning manner. Here, location, duration and/or type, in particular determined by size, color, luminosity, contrast and/or geometry, of the display can be changed or adapted when provided.

A motor vehicle according to the invention is provided with a position detection device for detecting a position of the motor vehicle, in particular in the form of a device with a global positioning system (GPS), an object detection device for detecting at least one object, in particular an object not relevant to road traffic, in particular in the surroundings of the motor vehicle and/or in the form of at least one camera, a LIDAR system, a radar set or the like, a data processing device configured to assign information to detected objects, a direction of view detection device for detecting the direction of view of at least one occupant of the motor vehicle, in particular of a passenger as the occupant of the motor vehicle, in particular in the form of at least one camera, an eye tracking system, a time of flight camera, or the like, and a display device for providing at least one display of at least one piece of information assigned to an object, in particular a piece of information assigned to an object in the landscape viewed by a passenger, wherein the display is providable in the direct field of view as defined by the detected direction of view of the at least one occupant, in particular in the direct field of view of the at least one passenger in the same place as the object.

Here, it can be provided that the position detection device is integrated in the motor vehicle or is provided via a smartphone, a tablet and/or a personal computer, the object detection device is integrated in the motor vehicle or is provided via a smartphone, a tablet and/or a personal computer, and the data processing device is integrated in the motor vehicle or is provided via a smartphone, a tablet and/or a personal computer.

It is further recommended that the display device for providing a display has a projection device for providing a light projection, in particular a head-up display, a hologram device for providing a holographic representation, a light-emitting diode display and/or a liquid-crystal display.

It can also be provided that the display device is at least partially embedded in the material, in particular glass material, of a windshield, a side window, a rear window, a sunroof and/or a panoramic window of the motor vehicle or in a device, in particular eyeglasses, worn by the occupant.

It is additionally recommended that the display device is at least partially embedded in a cladding, in particular a door cladding, roof cladding and/or seat cladding and/or a dashboard of the motor vehicle.

The display device preferably has a device for providing a head-up display. It is generally preferred for the display to be provided by a head-up display, since it can be provided with little effort. Preferably, the display occurs on the windshield, because, typically, the direction of view of the vehicle occupants is aimed at the same already. Additionally or alternatively, the display can be provided with a head-up display on a side window, a rear window, a sunroof or a panoramic window of the motor vehicle. Additionally or alternatively, the head-up display can further display on other, in particular non-transparent components of the motor vehicle, for example on an interior door classing, the dashboard or a seat. This can be useful for occupants not controlling the vehicle (e.g. Representation on the back of the front seats for passengers/occupants in the back of the vehicle). However, this can also be helpful for a motor vehicle operator when they are not looking through a window. A head-up display can depending on the direction of view of the occupant also in parts extend to a window and in other parts to another component of the motor vehicle. Furthermore, the display is providable by means of another projection rather than by a head-up display, such as two-dimensionally or using holograph technology, as well as being obtainable by light-emitting diodes (also organic ones, OLEDs) or liquid crystals (LCD display). For a display on the windshield, a side window, a rear window or a panoramic window, light-emitting means integrated in these (glass) bodies can also be used, in particular so-called see-through displays. Known techniques for the above utilize LCDs as well as inorganic and organic LEDs. Finally, a separate display on the dashboard (instrument panel) can additionally or alternatively be provided or an apparatus worn by the occupant (such as: eyeglasses) can include the display which is controllable through a data processing device of the motor vehicle.

The invention further proposes that the data processing device be configured to carry out the method according to the invention.

The data processing device can be connectable to a smartphone, tablet and/or personal computer in order to receive and/or send data.

The position detection device, the object detection device and/or the direction of view detection device can at least partially be mounted or mountable on or in a rear-view apparatus, in particular an interior rear-view apparatus, and/or the direction of view detection device can, however, also be at least partially mounted or mountable in or on a control panel.

Preferred exemplary embodiments of the present invention will now be described below in greater detail with reference to schematic drawings, in which

DETAILED DESCRIPTION

Figure 1:
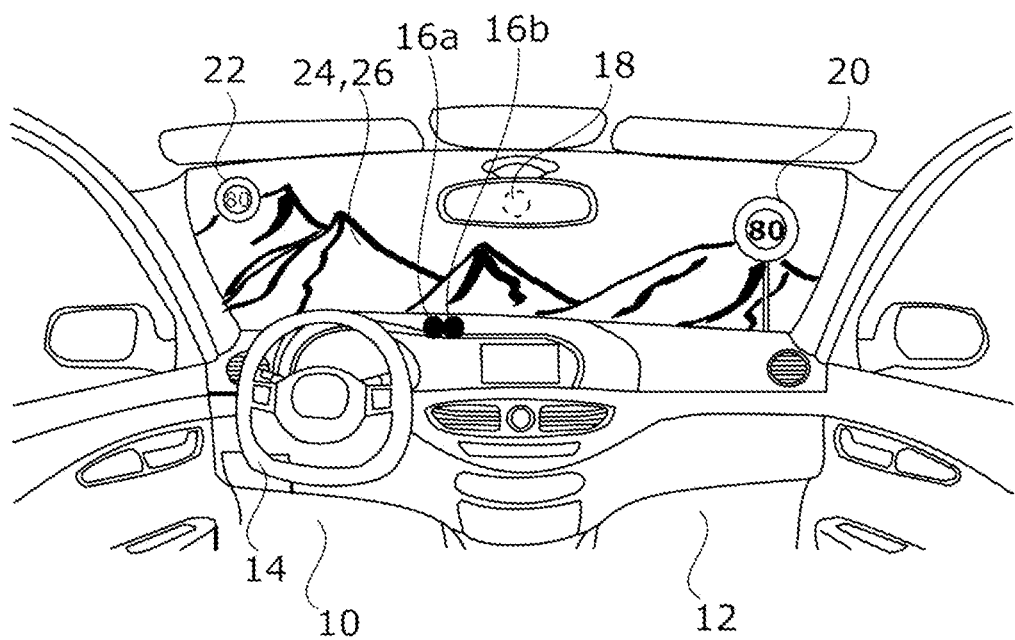
FIG. 1 shows a view of a vehicle occupant in a motor vehicle in which the method according to the invention is implemented.

In a motor vehicle shown from the view of an occupant in FIG. 1, the invention can be used for the occupant, and indeed both for an occupant sitting on the side 10 as the driver as well as for an occupant sitting on the side 12 as the passenger. The driver sits on the side of the steering wheel 14. One device 16a records the eye movements of the driver (so-called eye tracking) and one device 16b is provided for recording the eye movements of the passenger. A camera 18 behind the interior rear window detects the field of view in front of the motor vehicle. In the surroundings in front of the motor vehicle, there is a traffic sign 20, the position of which is detectable by the camera 18 and/or determinable via a GPS system not shown. If the driver looks in a different direction, meaning not at the traffic sign 20, or if it is detected by the camera 18 that the view of the traffic sign 20 is blocked, the driver is given a display 22 as a head-up display which provides them with the same information as the traffic sign 20. An object in the landscape, such as a mountain 24, is viewed by the passenger and information about 26 the object, for example its name and height, are indicated in the same place.

Figure 2:
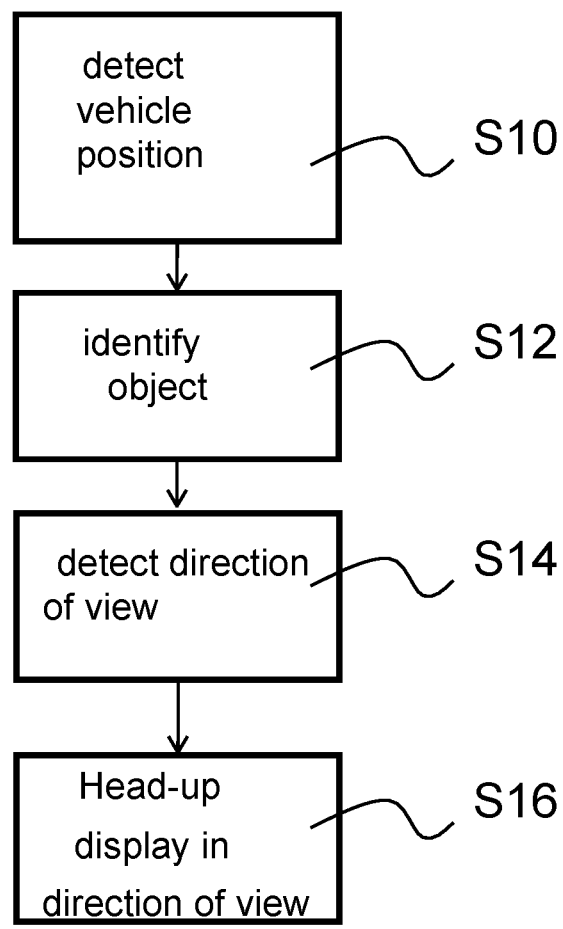
FIG. 2 is a flow chart generally describing the steps of the method according to the invention.

FIG. 2 is a flow chart generally describing the steps of the method according to the invention: In step S10, in particular using the GPS system of the motor vehicle, the position of the same is detected. Based on the position, data in a card memory in the motor vehicle or in a memory which is accessed wirelessly (such as a memory available on the internet) about objects in the surroundings of the vehicle may be examined and these objects thus be identified (step S12). Using the device 16a or the device 16b, the direction of view of the vehicle occupant(s) is detected (step S14) and, depending on the direction of view in the field of view of the respective vehicle occupant, a display 22, 26 is provided on the windshield wiper by a head-up display.

Figure 3:
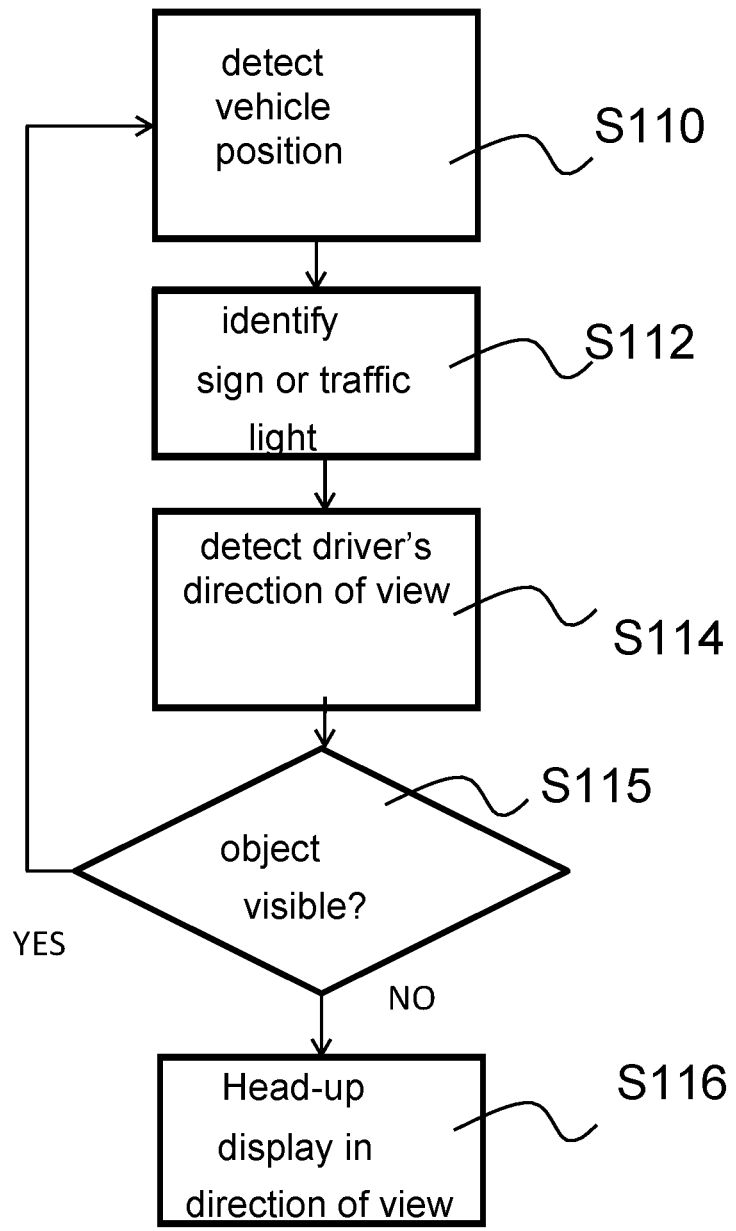
FIG. 3 is a flow chart describing the steps of the method according to the invention in an exemplary embodiment suitable for the vehicle operator.

If the vehicle occupant is the driver, it is determined whether, for example, a traffic sign 20 or a traffic light is in the surroundings of the motor vehicle according to FIG. 3 in step S112 after step S110 (corresponds to S10). In step S114, the direction of view of the driver is detected using the device 16a. In step S115, using the camera 18 and the position data downloadable from the memory, it is checked whether the traffic sign 20 or the traffic light is visible for the driver at all. Simultaneously, it can be checked if the driver is looking in that direction. In case one of the two is not the case ("No"), a display 22 of the traffic sign 20 or the traffic light is provided on the windshield by the head-up display according to step S116. In case the driver is already looking at the traffic sign 20 or the traffic light, the display is dispensable ("Yes", return to step S110).

Figure 4:
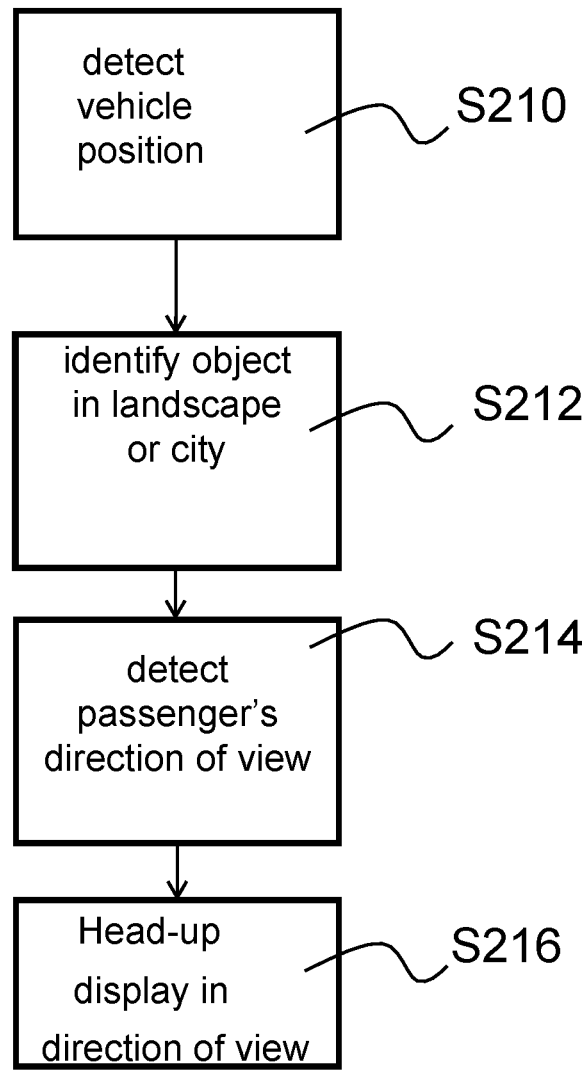
FIG. 4 is a flow chart describing the steps of the method according to the invention in an exemplary embodiment suitable for a passenger.

If the vehicle occupant is the passenger, then it is detected which landscape object 24 (mountain, mountain chain, hill, forest area, meadow, pasture, tree, bush etc.) or which object of a settlement (building, building complex, street, monument, well etc.) is in the surroundings of the motor vehicle according to FIG. 4 in step S12 after step S210 (corresponds to S10). In step S214, the direction of view of the passenger is detected using the device 16b. This way, it can be mapped, at which objects the passenger is looking. In the field of view of the passenger, a display 26 of information about the object 24 is then provided on the windshield by the head-up display according to step S216.

It is equally possible, albeit not described here in detail, to make the display dependent on the direction of view of the vehicle operator as well as that of a further occupant (the passenger). In this way, a display can occur in an area in which the fields of view of the driver and the passenger intersect. This is in particular true for the provision of information about objects not relevant to the traffic situation.

It is further a possibility to obtain information about the objects to be viewed, be it by the driver or the passenger, through data transfer with a smartphone, tablet or personal computer. The GPS system of the motor vehicle or of the smartphone, tablet or personal computer can also be used.

For example, a smartphone connected to a motor vehicle via Bluetooth can be used for position detection. Via the smartphone, depending on the respective position of the motor vehicle information about objects close to said position can additionally be obtained. In this way, for example, an app can be used which automatically follows a link to Wikipedia and displays texts about objects at which an occupant is looking, wherein the direction of view of the occupant can be detected via a camera system in the interior rear-view mirror of the motor vehicle.

However, instead of or in addition to a display of information about detected objects, a sound output is also possible, for example once again via the smartphone. A self-training effect can further be used and/or personal priorities can be taken into account, namely during the selection of the information to be displayed. If, for example, the occupant is interested in historical information, the history of the objects viewed by them can always be provided, even in the form of a film in the head-up display. The film can be uploaded via the smartphone from YouTube or similar.

The features of the invention disclosed in the above description, the claims and the drawings can be essential both individually and in any combination required for the realization of the invention in its different embodiments.

LIST OF REFERENCE NUMERALS

10 driver's side
12 passenger's side
14 steering wheel
16a, 16b devices for detecting eye movement
18 camera
20 traffic sign
22 representation of the traffic sign 20
24 object in the landscape
26 represented information about the object 24
S10, S12, S14, S16 Steps of the method in its general form
S110, S112, S114, S115, S116 Steps of the method as applied to the driver
S210, S212, S214, S216 Steps of the method as applied to the passenger

What is claimed is:

1. A method for providing a display in a motor vehicle, comprising:
    determining the position of the motor vehicle;
    identifying at least one object not relevant to road traffic as an object in the landscape in the surroundings of the motor vehicle, depending on the determined position;
    detecting a direction of view of an operator of the motor vehicle;
    detecting a direction of view of a passenger as an occupant of the motor vehicle; and
    providing a display with information about the at least one object in the landscape viewed by the passenger and the operator of the motor vehicle, such that said information is provided in an area in which the direction of view of the operator of the motor vehicle and the direction of view of the passenger intersect.

2. The method according to claim 1, wherein
    in the identifying step, at least one object relevant to road traffic including a traffic sign or a traffic light, is identified,
    in the detecting step, at least the direction of view of the motor vehicle operator is identified, and
    providing the display in the providing step occurs depending on whether the motor vehicle operator is capable of seeing the object themselves,
    wherein, it is also detected in the detecting step whether the motor vehicle operator is capable of seeing the object themselves directly.

3. The method according to claim 1, wherein the object not relevant to road traffic is a landmark, and providing the display in the detecting step includes information about the object in the form of a text display.

4. The method according to claim 3, wherein in the case of detection of autonomous driving of the motor vehicle, the motor vehicle operator or the motor vehicle operator and the passenger can be selected as the occupant.

5. The method according to claim 1, wherein the information provided with the display can be changed or adapted to the occupant, preferably in a self-learning manner.

6. The method according to claim 1, wherein location, duration or type, determined by size, color, luminosity, contrast or geometry, of the display can be changed or adapted when provided, in a self-learning manner.

7. A motor vehicle, comprising:
    a position detection device for detecting a position of the motor vehicle, in form of a device with a global positioning system;
    an object detection device for detecting at least one object not relevant to road traffic as an object in a landscape in the surroundings of the motor vehicle and/or, in the form of at least one camera, a LIDAR system, or a radar set;
    a data processing device configured to assign information to detected objects;
    a direction of view detection device for detecting a direction of view a passenger as the occupant of the motor vehicle and a direction of view of an operator of the motor vehicle, the direction of view detection device including at least one camera, an eye-tracking system, or a time of flight camera; and
    a display device for providing at least one display of at least one piece of information assigned to an object in the landscape viewed by the passenger and the operator of the motor vehicle, wherein the display is configured to be provided in an area in which the direction of view of the operator of the motor vehicle and the direction of view of the passenger intersect.

8. The motor vehicle according to claim 7, wherein
the position detection device is integrated in the motor vehicle or is provided via a smartphone, a tablet and/or a personal computer,
the object detection device is integrated in the motor vehicle or is provided via a smartphone, a tablet and/or a personal computer, and
the data processing device is integrated in the motor vehicle or is provided via a smartphone, a tablet and/or a personal computer.

9. The motor vehicle according to claim 7, wherein the display device for providing a display has a projection device for providing a light projection, in particular a head-up display, a hologram device for providing a holographic representation, a light-emitting diode display and/or a liquid-crystal display.

10. The motor vehicle according to claim 7, characterized in that the display device is at least partially embedded in the material, in particular glass material, of a windshield, a side window, a rear window, a sunroof and/or a panoramic window of the motor vehicle or in a device, in particular eyeglasses, worn by the occupant.

11. The motor vehicle according to claim 7, wherein the display device is at least partially embedded in a cladding, a door cladding, roof cladding and/or seat cladding and/or a dashboard of the motor vehicle.

12. The motor vehicle according to claim 7, wherein the data processing device is configured to carry out a method comprising
determining the position of the motor vehicle;
identifying at least one object not relevant to road traffic as an object in the landscape in the surroundings of the motor vehicle, depending on the determined position;
detecting at least the direction of view of a passenger as an occupant of the motor vehicle; and
providing a display with information about the at least one object in the landscape viewed by the passenger, so that said information is provided in the direct field of view of the passenger, as defined by the direction of view of the same, in the same place as the object.

13. The motor vehicle according to claim 7, wherein the data processing device is connectable to a smartphone, tablet and/or personal computer in order to receive and/or send data.

14. The motor vehicle according to claim 7, wherein,
the position detection device, the object detection device and/or the direction of view detection device is at least partially mounted or mountable on or in a rear-view apparatus, in particular an interior rear-view apparatus, and/or
the direction of view detection device is at least partially mounted or mountable in or on a control panel.

* * * * *